United States Patent [19]

Koyama

[11] Patent Number: 4,875,705
[45] Date of Patent: Oct. 24, 1989

[54] AUTOMOBILE REAR SUSPENSION STRUCTURE

[75] Inventor: Toshihide Koyama, Aki, Japan

[73] Assignee: Mazda Motor Corporation, Hiroshima, Japan

[21] Appl. No.: 181,422

[22] Filed: Apr. 14, 1988

[30] Foreign Application Priority Data

Apr. 14, 1987 [JP] Japan .................................. 62-92642

[51] Int. Cl.⁴ ............................................... B60G 3/18
[52] U.S. Cl. .................................... 280/697; 280/701; 280/690
[58] Field of Search ............... 280/701, 698, 697, 690, 280/666, 724, 725

[56] References Cited

U.S. PATENT DOCUMENTS 4,714,270 12/1987 Rumpel ............................ 280/690

FOREIGN PATENT DOCUMENTS

| 2035307 | 1/1972 | Fed. Rep. of Germany | 280/701 |
| 2038880 | 2/1972 | Fed. Rep. of Germany | 280/701 |
| 58-167205 | 11/1983 | Japan . | |
| 148707 | 8/1985 | Japan | 280/701 |

OTHER PUBLICATIONS

SAE (Society of Automotive Engineers) Technical Paper No. 831045, Manfred von der Ohe, "Front and Rear Suspension of the New Mercedes Model W201", 6/83.

Primary Examiner—Kenneth R. Rice
Assistant Examiner—Karin Tyson
Attorney, Agent, or Firm—Wenderoth, Lind & Ponack

[57] ABSTRACT

An automotive vehicle is provided with two rear suspension units for pivotably supporting respective rear wheels. Each rear suspension unit includes a wheel support for pivotably supporting one the rear wheels, an H-shaped lower control arm pivotably connected to the wheel support, an A-shaped upper control arm pivotably connected to the wheel support, and a damper unit pivotably connected at its lower end portion with either the wheel support or the lower control arm. The damper unit is disposed behind the upper control arm in a extending longitudinally of the vehicle body. The connecting portion at which the upper control arm and the wheel support are connected is located in front of the center of the rear wheel. Accordingly, an imaginary king pin axis is relatively largely inclined, which axis connects an outer rear end portion of the lower control arm and the connecting portion at which the upper control arm and the wheel support are connected. Such being the structure making up the rear suspension unit, the rear wheels are readily movable in a direction of toe-in, when a lateral force acts upon the rear wheels.

21 Claims, 6 Drawing Sheets

AUTOMOBILE REAR SUSPENSION STRUCTURE

BACKGROUND OF THE INVENTION

1. Field of the Invention

The present invention generally relates to automobile rear structure, and more particularly, to double wishbone type rear suspension structure for use in an automotive vehicle.

2. Description of the Prior Art

Japanese Utility Model Laid-open Application (Jikkaisho) No. 58-167205 discloses a double wishbone type automobile suspension, which is frequently utilized to pivotably support each wheel by way of a pair of upper and lower control arms.

In the aforementioned known double wishbone type suspension, however, a damper unit pivotably coupled with the lower control arm as to extends through a space formed in the upper control arm having a configuration generally in the form of the letter "A".

The employment of such structure gives rise to great difficulties from the viewpoint of design, since the upper control arm is limited in length to some extent. More specifically, although the upper control arm needs an opening for receiving therein the damper unit, it is necessary to make this opening relatively large so that the interference between the damper unit and the upper control arm is avoided when the rear wheels are bumped. Notwithstanding this fact, since the upper control arm is limited in length, it is difficult to provided a large opening therein.

Furthermore, since the damper unit extends through the upper control arm, it is difficult to service the damper.

SUMMARY OF THE INVENTION

Accordingly, the present invention has been developed to substantially eliminate the above described disadvantage inherent in the prior art automobile rear suspension, and has as its essential object to provide an improved automobile double wishbone type rear suspension structure which facilitates design freedom associated therewith and allows each rear wheel to be readily movable in a direction of toe-in.

Another object of the present invention is to provide a rear suspension unit of the above described type which has a simple structure and can be readily manufactured at a low cost.

In accomplishing these and other objects, an automobile rear suspension structure according to the present invention is provided with a knuckle arm or wheel support having one upper end portion and two lower end portions and pivotably supports one of rear wheels, an H-shaped lower control arm having two outer end portions respectively pivotably connected to the two lower end portions of the wheel support and front and rear inner end portions pivotably connected to a vehicle body, an A-shaped upper control arm having an outer end portion pivotably connected with the upper end portion of the wheel support and front and rear inner end portions pivotably connected with the vehicle body, and a damper unit pivotably connected at its upper end portion to the vehicle body to support the wheel support at a location below a connecting portion at which the upper control arm and the wheel support are connected. In the rear suspension of the present invention, the damper unit is disposed to the rear of the upper control arm with respect to the vehicle body.

In the above-described construction of the present invention, the offset between the damper unit and the upper control arm in a extending longitudinally of a vehicle body provides the design freedom for arranging the double wishbone type rear suspension in a limited space inside each rear wheel.

Moreover, since the upper control arm is disposed in front of the damper unit, it is possible to obtain a relatively large inclination of an imaginary king pin axis which connects an outer rear end portion of the lower control arm and a connecting portion at which the upper control arm and a wheel support are connected. Consequently, the amount of offset from the center of each rear wheel is correspondingly large and this fact gives rise to the ability of the rear wheels to, be readily movable in a direction of toe-in when they are subjected to a lateral force.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and in which:

FIG. 4 is a schematic diagram showing the structural relationship which allows each rear wheel to be readily movable in a direction of toe-in;

DETAILED DESCRIPTION OF THE PREFERRED EMBODIMENT

Figure 1:
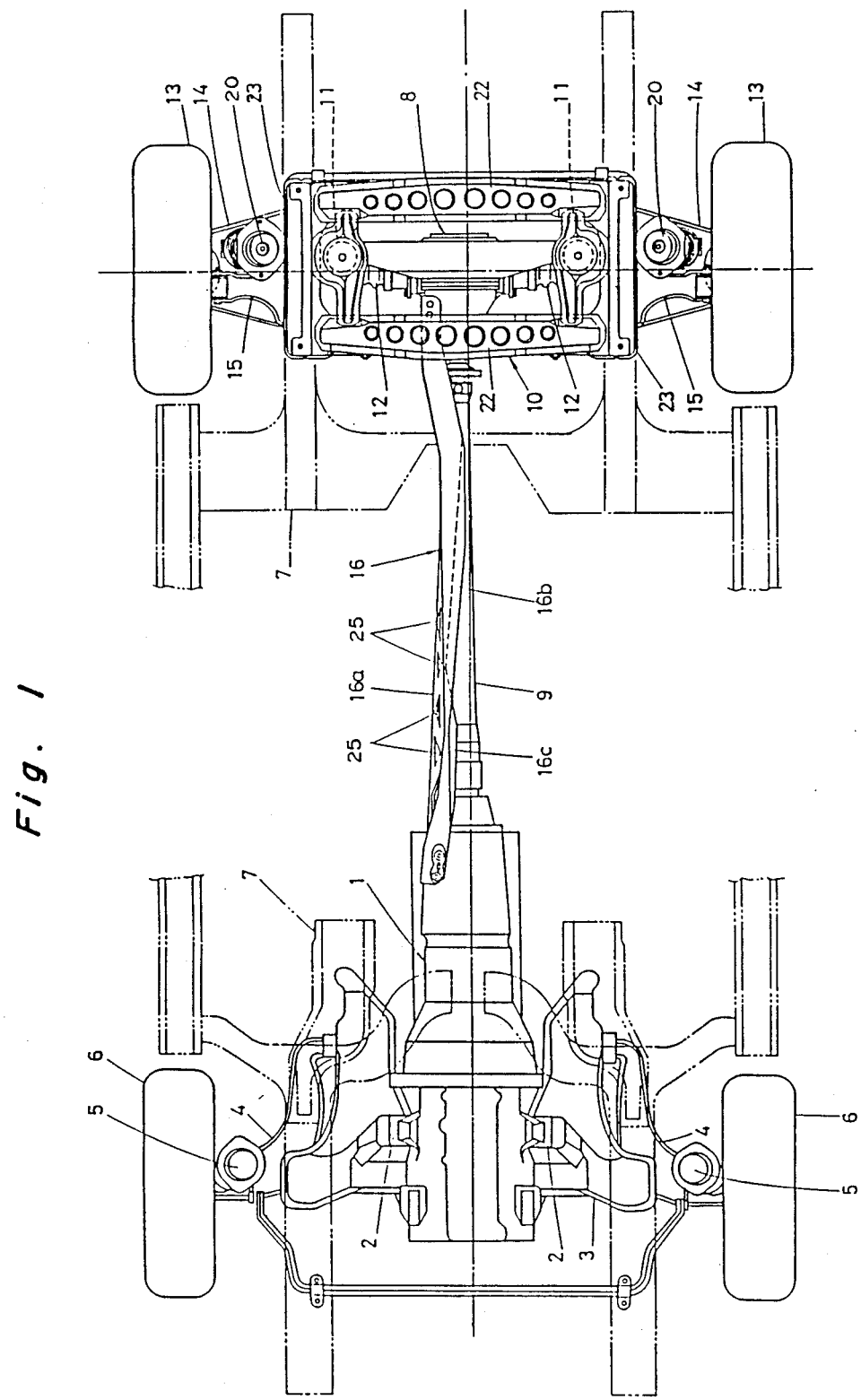
FIG. 1 is a top plan view of a chassis of an automotive vehicle having therein a rear suspension according to an embodiment of the present invention.

Referring first to FIG. 1, an engine and transmission unit 1 on the front of an automotive vehicle is securely mounted on a front cross member 3 in any known manner by way of a pair of engine mounts or engine supports 2 arranged widthwise of a vehicle body. A pair of control arms 4 are pivotably connected at their respective ends to opposite ends of the front cross member 3 whereas a pair of front wheels 6 are pivotably connected to the other respective ends of the control arms 4. The front wheels 6 are supported on a vehicle body 7 through a pair of respective damper units 5. The front cross member 3 is supported on the vehicle body 7 through a suitable elastic member (not shown) in any known manner. The engine and transmission unit 1 is comprised of an engine as a driving source, a clutch and a transmission.

The engine and transmission unit 1 is coupled with a differential unit 8 disposed at the rear of the automotive vehicle by way of a driving shaft 9. The differential unit 8 is supported by a rear cross member 10 through a pair of elastic members 11 and is so constructed as to transmit a driving force to rear wheels 13 by way of respective axle shafts 12. The rear cross member 10 is supported by the vehicle body 7 via a suitable elastic member (not shown) in any known manner and comprises a pair of juxtaposed first members 22 extending in a direction widthwise of the vehicle body, a pair of opposed second members 23 extending substantially vertically and each rigidly secured at its upper portion to one end of each first member 22, and a pair of third members 24 rigidly secured to lower portions of the second members 23 and to a lower surface of a central portion of each first member 22, as shown in FIGS. 2 and 3.

The engine and transmission unit 1 and the differential unit 8 are securely coupled with each other by a power plant frame 16 having a cross section generally in the form of a letter "U". The power plant frame 16 has one vertical side 16a and two opposed upper and lower horizontal sides 16b and 16c extending from opposite edges of the vertical side 16a so that an opening is defined between the opposed horizontal sides 16b and 16c. Accordingly, the power plant frame 16 exhibits relatively high bending rigidity and flexibility under torsion. Furthermore, in this embodiment, a plurality of holes 25 having a suitable configuration are formed in the vertical side 16a of the power plant frame 16 and, each of the horizontal sides 16b and 16c thereof has an intermediate portion narrower than its opposite end portions. Consequently, the power plant frame 16 not only exhibits sufficient bending rigidity, but is a relatively high degree of flexibility under torsion, while being; comparatively light weight. The power plant frame 16 encircles the majority of the driving shaft 9.

Figure 2:
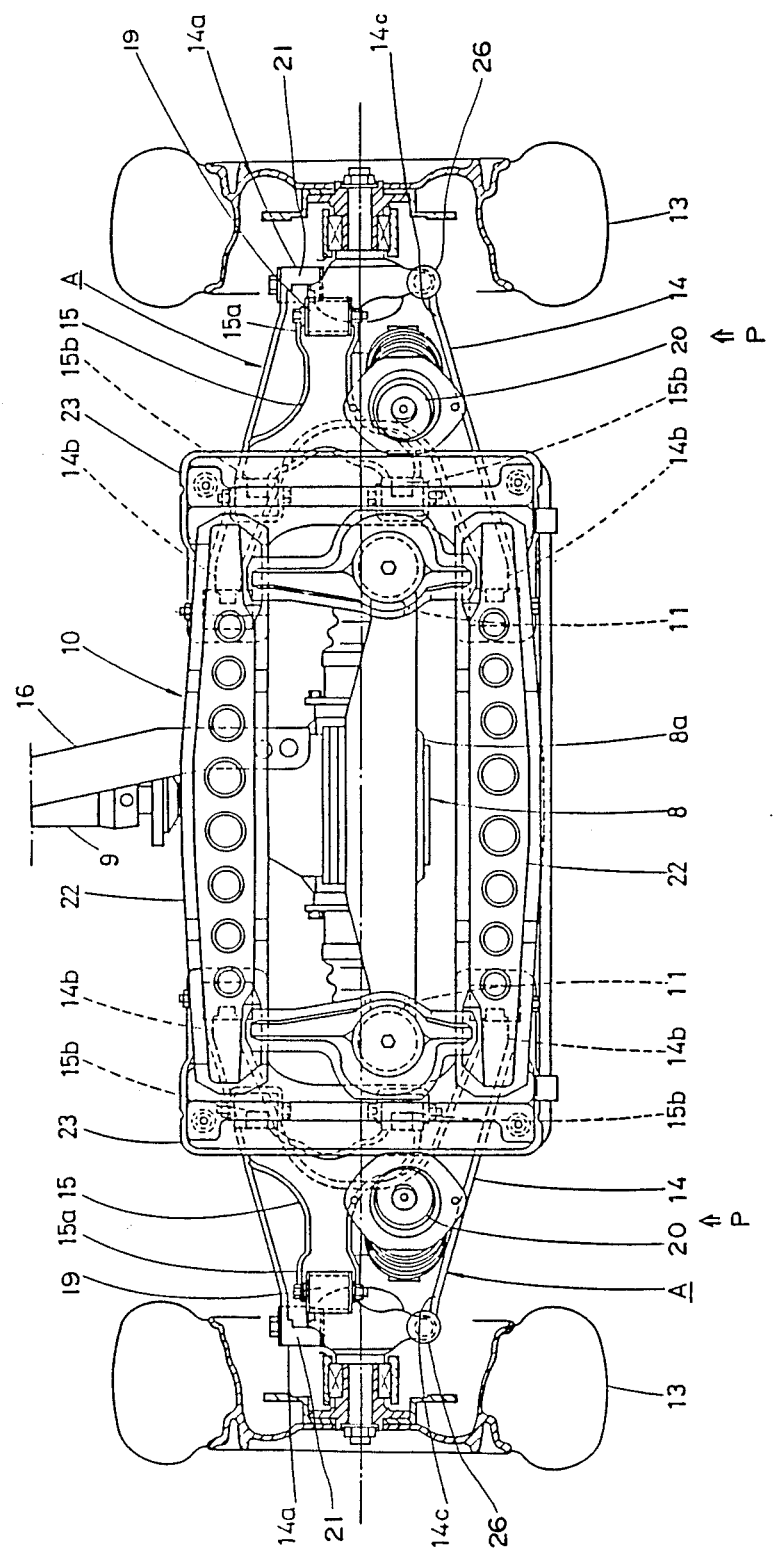
FIG. 2 is a top plan view, partly in section, of an automobile rear suspension of the present invention.
Figure 3:
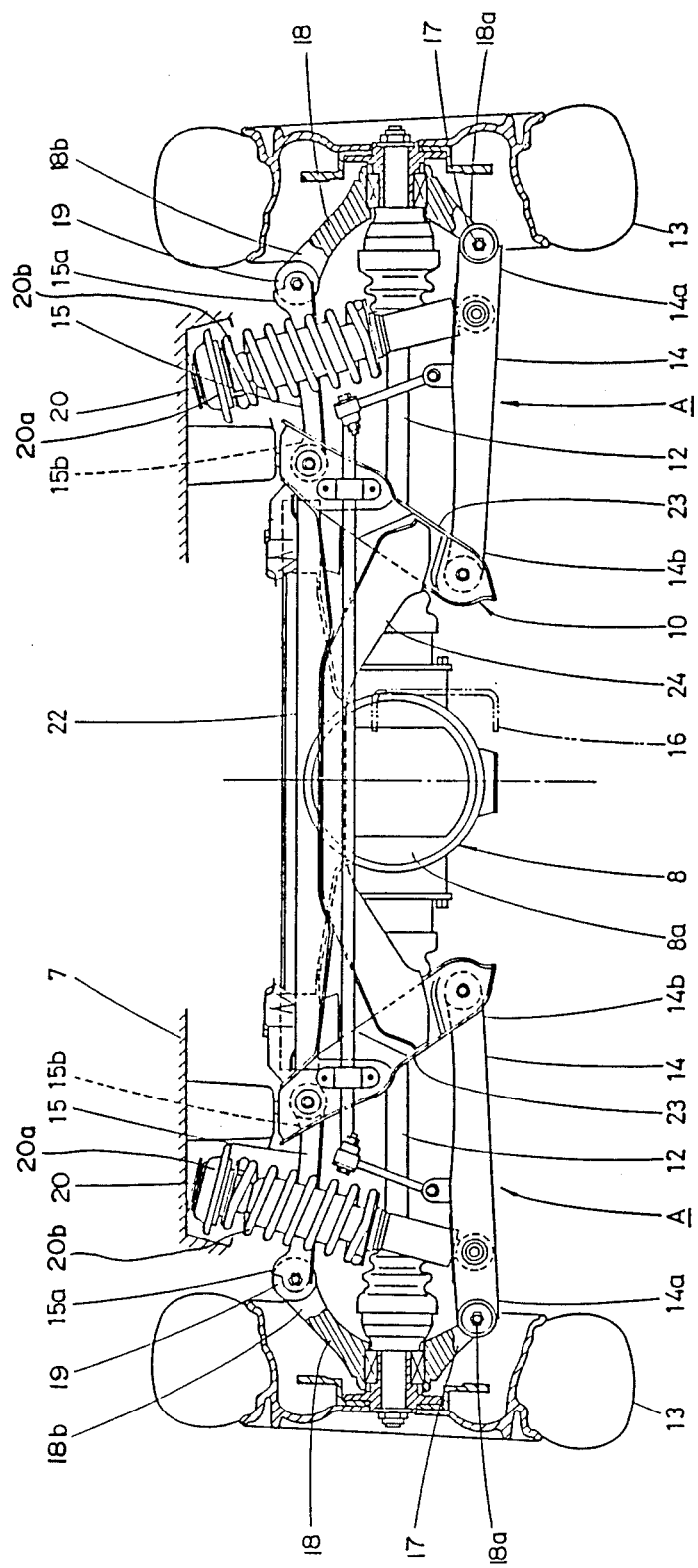
FIG. 3 is an elevational view, partly in section of the rear suspension of FIG. 2 as viewed in the direction shown by arrows P.

Referring next to FIGS. 2 and 3, an automobile rear suspension will be explained hereinafter according to one preferred embodiment of the present invention.

An automotive vehicle has two rear suspension units A for pivotably supporting respective rear wheels 13.

Each rear suspension unit A is a double wishbone type comprising an H-shaped lower control arm 14, an A-shaped upper control arm 15, a shaft 17 pivotably connected at its opposite ends to opposed outer end portions 14a and 14c of the lower control arm 14 (that is, at two locations spaced longitudinally of the vehicle body), a knuckle arm or wheel support 18 having a lower end portion 18a pivotably connected to the shaft 17 and an upper end portion 18b pivotably connected to an outer end portion 15a of the upper control arm 15 by way of a bush 19, and a damper unit 20 pivotably connected at its lower end to the lower control arm 14. The upper control arm 15 is bifurcated at its inner end, with the bifurcated portion thereof being located inwardly of the damper unit 20 with respect to the width of the vehicle body. The damper unit 20 comprises a damper 20a and a coil spring 20b. the connecting portion at which the upper control arm 15 and the knuckle arm 18 are connected is located in front of the center of rear wheels 13, whereas the two connecting portions at which the lower control arm 14 and the knuckle arm 18 are connected are respectively located in front and to the rear of the center of rear wheels 13. The upper and lower control arms 15 and 14 are pivotably connected at their respective inner end portions 15b and 14b to upper and lower portions of the rear cross member 10, respectively.

The damper unit 20 is located to the rear of the upper control arm 15 and has an upper end portion supported on the vehicle body 7 in any known manner. In this way, since the upper control arm 15 and the damper unit 20 are spaced apart from each other or are offset longitudinally of the vehicle body 7, both the upper control arm 15 and the damper unit 20 can be secured within a limited space between the rear cross member 10 and each rear wheel 13, thus preventing interference between the damper unit 20 and the axle shaft 12. Particularly, as shown in this embodiment, that is to say, in a chassis structure in which the engine and transmission unit 1 disposed at the front of the vehicle body 7 and the differential unit 8 disposed at the rear thereof are rigidly coupled by the power plant frame 16, a longer interval in which the differential unit 8 may be suitably mounted on the vehicle body 7 is advantageous with respect to the amount of torsion or the like that can be generated. This fact limits the space that can be provided between each rear wheel 13 and the rear cross member 10 for accommodating the rear suspension unit A. Accordingly, the offset between the upper control arm 15 and the damper unit 20 in a direction longitudinally of the vehicle body 7 can advantageously contribute to the design freedom associated therewith.

There are provided a rubber bush 21 and a ball joint 26, respectively, at front and rear connecting portions at which the shaft 17 and two lower end portions 18a of the knuckle arm 18 are pivotably connected to each other. In other words, at the rear connecting portion at which the shaft 17 and the lower end portions 18a of the knuckle arm 18 are connected is provided the ball joint 26 is stiffer than the rubber bush 21 provided at the front connecting portion. The ball joint 26 may be replaced by other rubber bushes having spring constants larger than the rubber bush 21.

The function of the automobiles rear suspension unit will be explained hereinafter.

The offset relationship between the damper unit 20 and the upper control arm 15 in a direction longitudinally of the vehicle body contributes to the design freedom associated with arranging the double wishbone type rear suspension A within a limited space. Moreover, the ball joint 26 disposed at the outer rear end portion 14c of the lower control arm 14 is stiffer than the rubber bush 21 disposed on the outer front end portion 14a thereof. This construction renders the stiffness at the front connecting portion 14a of the lower control arm 14 to be relatively low compared to that at the rear connecting portion 14c thereof.

Figure 4:
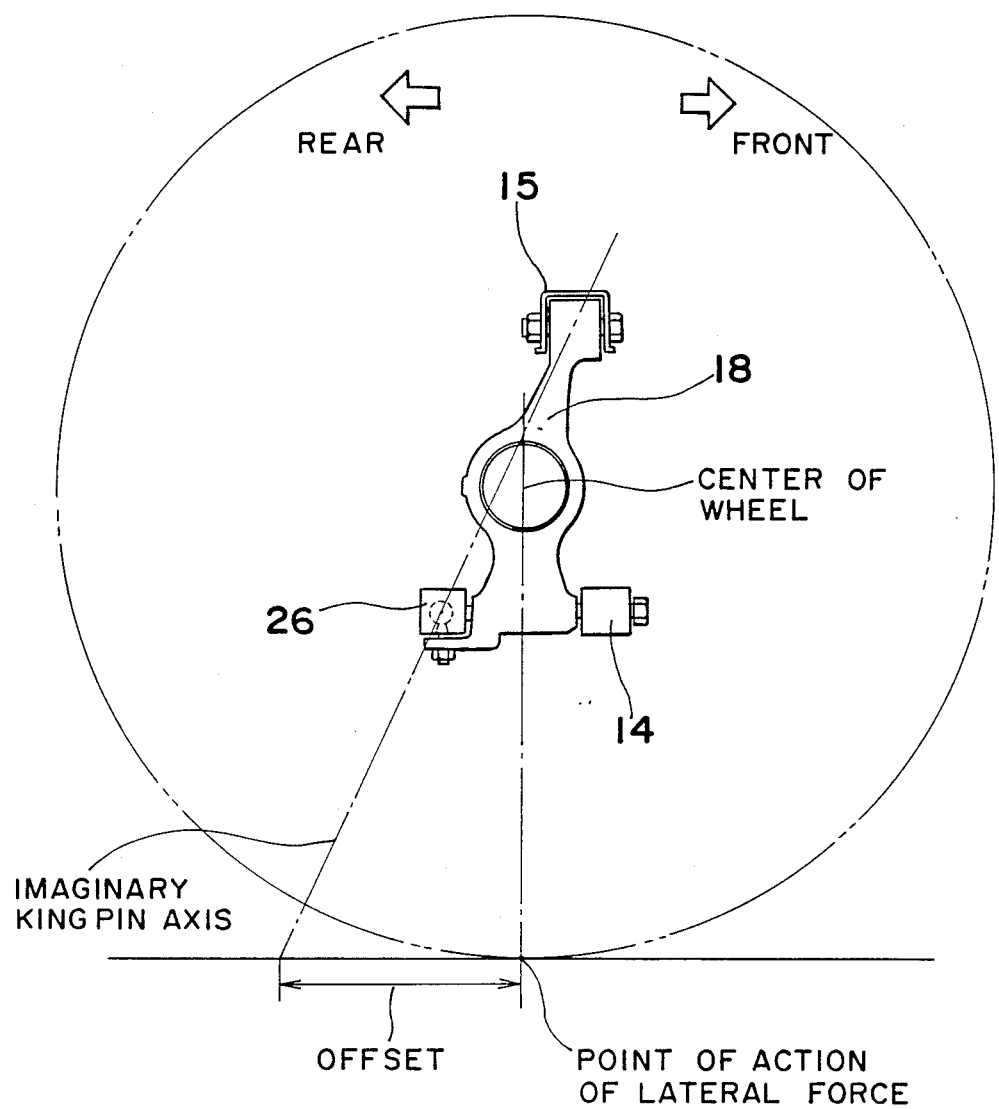

In addition, as shown in FIGS. 2 and 4, the upper control arm 15 is arranged in front of the damper unit 20 with respect to the vehicle body so that the inclination of an imaginary king pin axis is relatively large, which axis connects the outer rear end portion 14c of the lower control arm 14 and the connecting portion 19 at which the upper control arm 15 is connected to the knuckle arm 18. Consequently, the amount of offset from the center of each rear wheel 13 is relatively large. That is to say, the distance between a point at which ear rear wheel 13 contacts the road surface and a point at which the imaginary king pin axis intersects the road surface is relatively large. Accordingly, the rear wheels 13 can readily move in a direction of toe-in, when a lateral force acts thereupon.

More specifically, when the rear wheels 13 are subjected to a lateral force, for example, when the automotive vehicle turns a corner, the knuckle arms 18 for supporting the respective rear wheels 13 are caused to rotate so that the rear wheels 13 may be directed inwardly of the vehicle body. This phenomenon is called "toe-in" resulting in that spinning of the automotive vehicle is inhibited, and therefore, the stability of the vehicle during cornering can be advantageously improved.

It is to be noted here that in this embodiment, although the lower control arm 14 has different spring constants at the two outer end portions 14a and 14c at which it is connected to the lower ends 18a of the knuckle arm 18 for facilitating toe-in, the same spring constant may be provided at end portions at which the support arms are connected to the upper and lower ends 18b and 18a of the knuckle arm 18. In short, the arrangement of the upper control arm 15 in front of the damper unit 20 with respect to the vehicle body allows the toe-in to readily take place.

Figure 5:
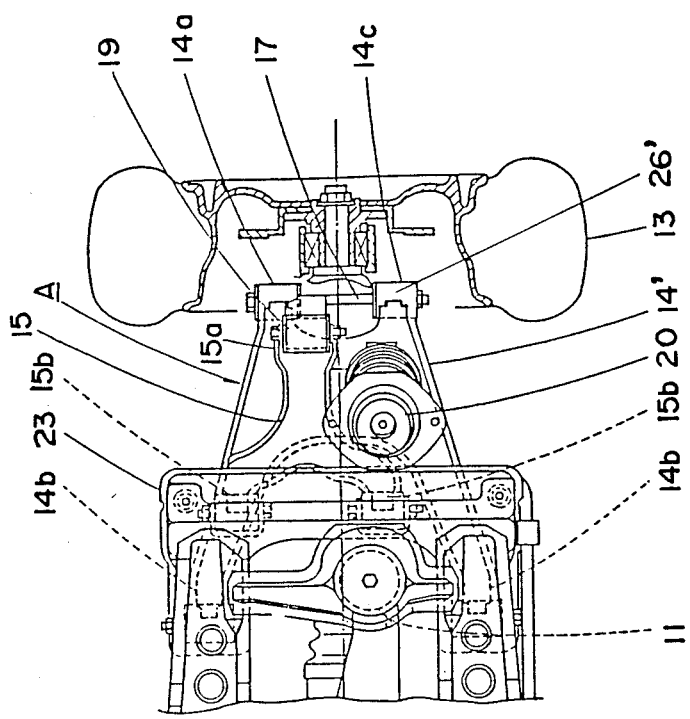
FIG. 5 is a view similar to FIG. 2, which particularly shows a modification of the rear suspension.

FIG. 5 illustrates a modification of the present invention in which the lower control arm 14' is rigidly secured at its outer rear end portion to another rubber bush 26' which is pivotably coupled with the shaft 17.

Figure 6:
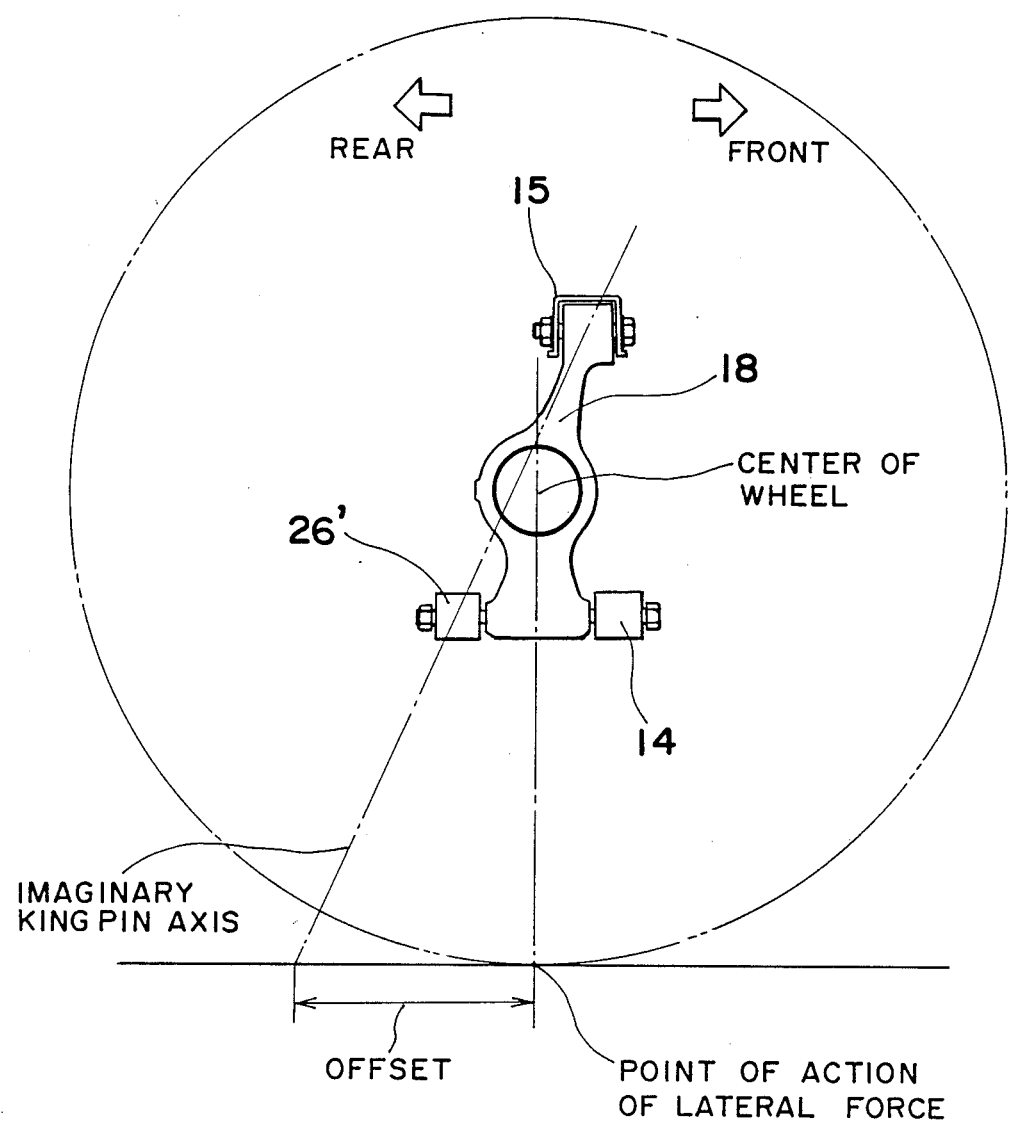
FIG. 6 is a diagram similar to FIG. 4, but as applied to the rear suspension of FIG. 5.

FIG. 6 shows, as in FIG. 5, a relatively large offset between a point of action of the lateral force and a point the imaginary king pin axis and the road surface intersect.

Figure 7:
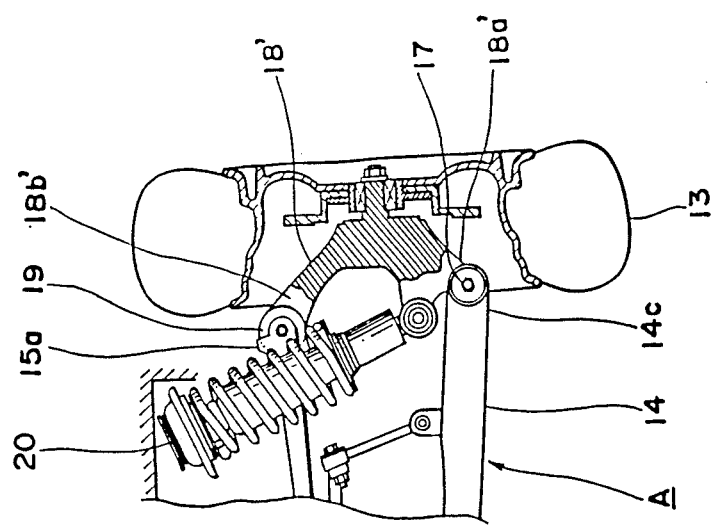
FIG. 7 is a view similar to FIG. 3, which particularly shows another modification of the rear suspension.

The damper unit 20 may be pivotally coupled at its lower end portion with the knuckle arm 18' instead of the lower control arm 14, as shown in FIG. 7, which particularly shows another modification of the present invention.

From the foregoing, the present invention is drawn to an automobile rear suspension unit A comprising an H-shaped lower control arm 14, an A-shaped upper control arm 15, a knuckle arm or wheel support 18 having longitudinally opposed lower end portions 18a pivotably connected to the outer end portions 14a and 14c of the lower control arm 14 and an upper end portion 18b pivotably connected to the upper control arm 15, and a damper unit 20 having a lower end pivotably connected to the lower control arm 14 and an upper end pivotably connected to the vehicle body. According to the present invention, since the upper control arm 15 is located in front of the damper unit 20, the inclination of imaginary king pin axis connecting the outer rear end portion 14c of the lower control arm 14 and the connecting portion at which the upper control arm 15 and the wheel support 18 are connected is relatively large so that the amount of offset from the center of each rear wheel 13 is correspondingly large. Accordingly, the rear wheels 13 are advantageously effectively movable in a direction of toe-in takes, when they are subjected to a lateral force.

Furthermore, the offset arrangement between the damper unit 20 and the upper control arm 15 in a direction longitudinally of the vehicle body eliminates the necessity of extending the damper unit 20 through the upper control arm 15 and can contribute to the design freedom associated with arranging the double wishbone type rear suspension A within a limited space defined inside each rear wheel 13. Such an arrangement is also advantageous in that the damper unit 20 may be easily serviced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. Rear suspension structure of an automotive vehicle having rear wheels and a vehicle body including a front end and a rear end, said structure comprising:
    a rear wheel support supporting a said rear wheel of the vehicle,
    said wheel support including an upper end portion, a front lower end portion disposed below said upper end portion, and a rear lower end portion disposed below said upper end portion and rearwardly of said front lower end portion, with respect to the vehicle body;
    an H-shaped lower control arm having two outer end portions respectively connected to the lower end portions of said rear wheel support, and front and rear inner end portions disposed inwardly of said two outer end portions with respect to the width of the vehicle body and connected to the vehicle body in a manner which allows said lower control arm to pivot relative to the vehicle body,
    a rubber bush pivotally connecting one of the outer end portions of said lower control arm and the front lower end portion of said rear wheel support,
    a ball joint pivotally connecting the other of said outer end portions and the rear lower end portion of said rear wheel support;
    an A-shaped upper control arm having an outer end portion pivotally connected to the upper end portion of said rear wheel support, and front and rear inner end portions disposed inwardly of the outer end portion of said upper control arm with respect to the width of the vehicle body and connected to the vehicle body in a manner which allows said upper control arm to pivot relative to the vehicle body; and
    a damper unit disposed rearwardly of said upper control arm with respect to the vehicle body,
    said unit including an upper end portion connected to the vehicle body, and a lower end portion connected to one of said lower control arm and said wheel support at a location disposed below the location at which the outer end portion of said upper control arm is connected to the upper end portion of said rear wheel support.

2. Rear suspension structure as claimed in claim 1, wherein the location at which the upper end portion of said upper control arm is connected to the upper end portion of said rear wheel support is disposed relative to said ball joint such that a line passing through said location and said ball joint intersects a flat surface rearwardly, with respect to the vehicle body, of a point at which said rear wheel contacts the flat surface with the automotive vehicle disposed on the flat surface.

3. Rear suspension structure as claimed in claim 1, wherein the outer end portion of said upper control arm and the upper end portion of said rear wheel support are connected at a location disposed frontwardly of the center of said rear wheel with respect to the vehicle body.

4. Rear suspension structure as claimed in claim 3, wherein the outer end portions of said lower control arm are connected to the lower end portions of said rear wheel support at respective locations disposed in front of and to the rear of the center of said rear wheel with respect to the vehicle body.

5. Rear suspension structure as claimed in claim 4, wherein the lower end portion of said damper unit is pivotally connected to said lower control arm.

6. Rear suspension structure as claimed in claim 5, wherein said damper unit comprises a damper and a coil spring.

7. Rear suspension structure as claimed in claim 4, wherein said upper control arm has a bifurcated portion comprising said front and said rear inner end portions thereof, said bifurcated portion disposed inwardly of said damper unit with respect to the width of the vehicle body.

8. Rear suspension structure as claimed in claim 4, and further comprising a rear cross member supported by the vehicle body at the rear end thereof, the inner end portions of said upper and said lower control arms each pivotally connected to said cross member.

9. Rear suspension structure as claimed in claim 8, wherein said rear cross member comprises a pair of juxtaposed first members extending widthwise of the vehicle body and each of which has a central portion including a lower surface, a pair of opposed second members extending substantially vertically and each of which has an upper portion at which the second member is secured to said first members and a lower portion, and a pair of third members each of which is rigidly secured to the lower portion of a respective one of said second members and the lower surface of the central portion of both of said first members.

10. Rear suspension structure of an automotive vehicle having rear wheels and a vehicle body including a front end and a rear end, said structure comprising:
 a rear wheel support supporting a said rear wheel of the vehicle,
 said wheel support including an upper end portion, a front lower end portion disposed below said upper end portion, and a rear lower end portion disposed below said upper end portion and rearwardly of said front lower end portion, with respect to the vehicle body;
 an H-shaped lower control arm having two outer end portions respectively connected to the lower end portions of said rear wheel support, and front and rear inner end portions disposed inwardly of said two outer end portions with respect to the width of the vehicle body and connected to the vehicle body in a manner which allows said lower control arm to pivot relative to the vehicle body,
 a first rubber bush pivotally connecting one of the outer end portions of said lower control arm and the front lower end portion of said rear wheel support,
 a second rubber bush pivotally connecting the other of said outer end portions and the rear lower end portion of said rear wheel support,
 said second rubber bush being stiffer than said first rubber bush;
 an A-shaped upper control arm having an outer end portion pivotally connected to the upper end portion of said rear wheel support, and front and rear inner end portions disposed inwardly of the outer end portion of said upper control arm with respect to the width of the vehicle body and connected to the vehicle body in a manner which allows said upper control arm to pivot relative to the vehicle body; and
 a damper unit disposed rearwardly of said upper control arm with respect to the vehicle body,
 said unit including an upper end portion connected to the vehicle body, and a lower end portion connected to one of said lower control arm and said wheel support at a location disposed below the location at which the outer end portion of said upper control arm is connected to the upper end portion of said rear wheel support.

11. Rear suspension structure as claimed in claim 20, wherein the outer end portion of said upper control arm and the upper end portion of said rear wheel support are connected at a location disposed frontwardly of the center of said rear wheel with respect to the vehicle body.

12. Rear suspension structure as claimed in claim 11, wherein the outer end portions of said lower control arm are connected to the lower end portions of said rear wheel support at respective locations disposed in front of and to the rear of the center of said rear wheel with respect to the vehicle body.

13. Rear suspension structure as claimed in claim 12, wherein the lower end portion of said damper unit is pivotally connected to said lower control arm.

14. Rear suspension structure as claimed in claim 13, wherein said damper unit comprises a damper and a coil spring.

15. Rear suspension structure as claimed in claim 12, wherein said upper control arm has a bifurcated portion comprising said front and said rear inner end portions thereof, said bifurcated portion disposed inwardly of said damper unit with respect to the width of the vehicle body.

16. Rear suspension structure as claimed in claim 12, and further comprising a rear cross member supported by the vehicle body at the rear end thereof, the inner end portions of said upper and said lower control arms each pivotally connected to said cross member.

17. Rear suspension structure as claimed in claim 16, wherein said rear cross member comprises a pair of juxtaposed first members extending widthwise of the vehicle body and each of which has a central portion including a lower surface, a pair of opposed second members extending substantially vertically and each of which has an upper portion at which the second member is secured to said first members and a lower portion, and a pair of third members each of which is rigidly secured to the lower portion of a respective one of said second members and the lower surface of the central portion of both of said first members.

18. Rear suspension structure of an automotive vehicle having rear wheels and a vehicle body including a front end and a rear end, said structure comprising:
 a rear wheel support supporting a said rear wheel of the vehicle,
 said wheel support including an upper end portion, a front lower end portion disposed below said upper end portion, and a rear lower end portion disposed below said upper end portion and rearwardly of said front lower end portion, with respect to the vehicle body;
 a lower control arm having two outer end portions respectively connected to the lower end portions of said rear wheel support, and front and rear inner end portions disposed inwardly of said two outer end portions with respect to the width of the vehicle body and connected to the vehicle body in a manner which allows said lower control arm to pivot relative to the vehicle body, the outer end portions of said lower control arm being connected to the lower end portions of said rear wheel support at respective locations disposed in front of and to the rear of the center of said rear wheel with respect to the vehicle body, a rubber bush pivotally connecting one of the outer end portions of said lower control arm and the front lower end portion of said rear wheel support, a ball joint pivotally connecting the other of said outer end portions and the rear lower end portion of said rear wheel support;

an upper control arm having an outer end portion pivotally connected to the upper end portion of said rear wheel support, and front and rear inner end portions disposed inwardly of the outer end portion of said upper control arm with respect to the width of the vehicle body and connected to the vehicle body in a manner which allows said upper control arm to pivot relative to the vehicle body, the outer end portion of said upper control arm and the upper end portion of said rear wheel support being connected at a location disposed frontwardly of the center of said rear wheel with respect to the vehicle body; and a damper unit disposed rearwardly of said upper control arm with respect to the vehicle body, said unit including an upper end portion connected to the vehicle body, and a lower end portion connected to one of said lower control arm and said wheel support at a location disposed below the location at which the outer end portion of said upper control arm is connected to the upper end portion of said rear wheel support.

19. Rear suspension structure of an automotive vehicle having rear wheels and a vehicle body including a front end and a rear end, said structure comprising:

a rear wheel support supporting a said rear wheel of the vehicle, said wheel support including an upper end portion, a front lower end portion disposed below said upper end portion, and a rear lower end portion disposed below said upper end portion and rearwardly of said front lower end portion, with respect to the vehicle body;

a lower control arm having an H-shaped lower control arm having two outer end portions respectively connected to the lower end portions of said rear wheel support, and front and rear inner end portions disposed inwardly of said two outer end portions with respect to the width of the vehicle body and connected to the vehicle body in a manner which allows said lower control arm to pivot relative to the vehicle body, the outer end portions of said lower control arm being connected to the lower end portions of said rear wheel support at respective locations disposed in front of and to the rear of the center of said rear wheel with respect to the vehicle body, a first rubber bush pivotally connecting one of the outer end portions of said lower control arm and the front lower end portion of said rear wheel support, a second rubber bush pivotally connecting the other of said outer end portions and the rear lower end portion of said rear wheel support, said second rubber bush being stiffer than said first rubber bush;

an upper control arm having an outer end portion pivotally connected to the upper end portion of said rear wheel support, and front and rear inner end portions disposed inwardly of the outer end portion of said upper control arm with respect to the width of the vehicle body and connected to the vehicle body in a manner which allows said upper control arm to pivot relative to the vehicle body, the outer end portion of said upper control arm and the upper end portion of said rear wheel support being connected at a location disposed frontwardly of the center of said rear wheel with respect to the vehicle body; and a damper unit disposed rearwardly of said upper control arm with respect to the vehicle body, said unit including an upper end portion connected to the vehicle body, and a lower end portion connected to one of said lower control arm and said wheel support at a location disposed below the location at which the outer end portion of said upper control arm is connected to the upper end portion of said rear wheel support.

20. Rear suspension structure of an automotive vehicle having rear wheels and a vehicle body including a front end and a rear end, said structure comprising:

a rear wheel support supporting a said rear wheel of the vehicle, said wheel support including an upper end portion, a front lower end portion disposed below said upper end portion, and a rear lower end portion disposed below said upper end portion and rearwardly of said front lower end portion, with respect to the vehicle body;

an H-shaped lower control arm having two outer end portions respectively connected to the lower end portions of said rear wheel support, and front and rear inner end portions disposed inwardly of said two outer end portions with respect to the width of the vehicle body and connected to the vehicle body in a manner which allows said lower control arm to pivot relative to the vehicle body, a first rubber bush pivotally connecting one of the outer end portions of said lower control arm and the front lower end portion of said rear wheel support, a second rubber bush pivotally connecting the other of said outer end portions and the rear lower end portion of said rear wheel support, said second rubber bush being stiffer than said first rubber bush; and an A-shaped upper control arm having an outer end portion pivotally connected to the upper end portion of said rear wheel support, and front and rear inner end portions disposed inwardly of the outer end portion of said upper control arm with respect to the width of the vehicle body and connected to the vehicle body in a manner which allows said upper control arm to pivot relative to the vehicle body the outer end portion of said upper control arm and the upper end portion of said rear wheel support being connected at a location disposed frontwardly of the center of said rear wheel with respect to the vehicle body.

21. Rear suspension structure of an automotive vehicle having rear wheels and a vehicle body including a front end and a rear end, said structure comprising:

a rear wheel support supporting a said rear wheel of the vehicle, said wheel support including an upper end portion, a front lower end portion disposed below said upper end portion, and a rear lower end portion disposed below said upper end portion and rearwardly of said front lower end portion, with respect to the vehicle body;

an H-shaped lower control arm having two outer end portions respectively connected to the lower end portions of said rear wheel support, and front and rear inner end portions disposed inwardly of said two outer end portions with respect to the width of the vehicle body and connected to the vehicle body in a manner which allows said lower control arm to pivot relative to the vehicle body, a rubber bush pivotally connecting one of the outer end portions of said lower control arm and the front lower end portion of said rear wheel support, a ball joint pivotally connecting the other of said outer end portions and the rear lower end portion of said rear wheel support; and an A-shaped upper control arm having an outer end portion pivotally connected to the upper end portion of said rear wheel support, and front and rear inner end portions disposed inwardly of the outer end portion of said upper control arm with respect to the width of the vehicle portions disposed inwardly of the outer end portion of said upper control arm with respect to the width of the vehicle body and connected to the vehicle body in a manner which allows said upper control arm to pivot relative to the vehicle body the outer end portion of said upper control arm and the upper end portion of said rear wheel support being connected at a location disposed frontwardly of the center of said rear wheel with respect to the vehicle body.

* * * * *